Figure 1:
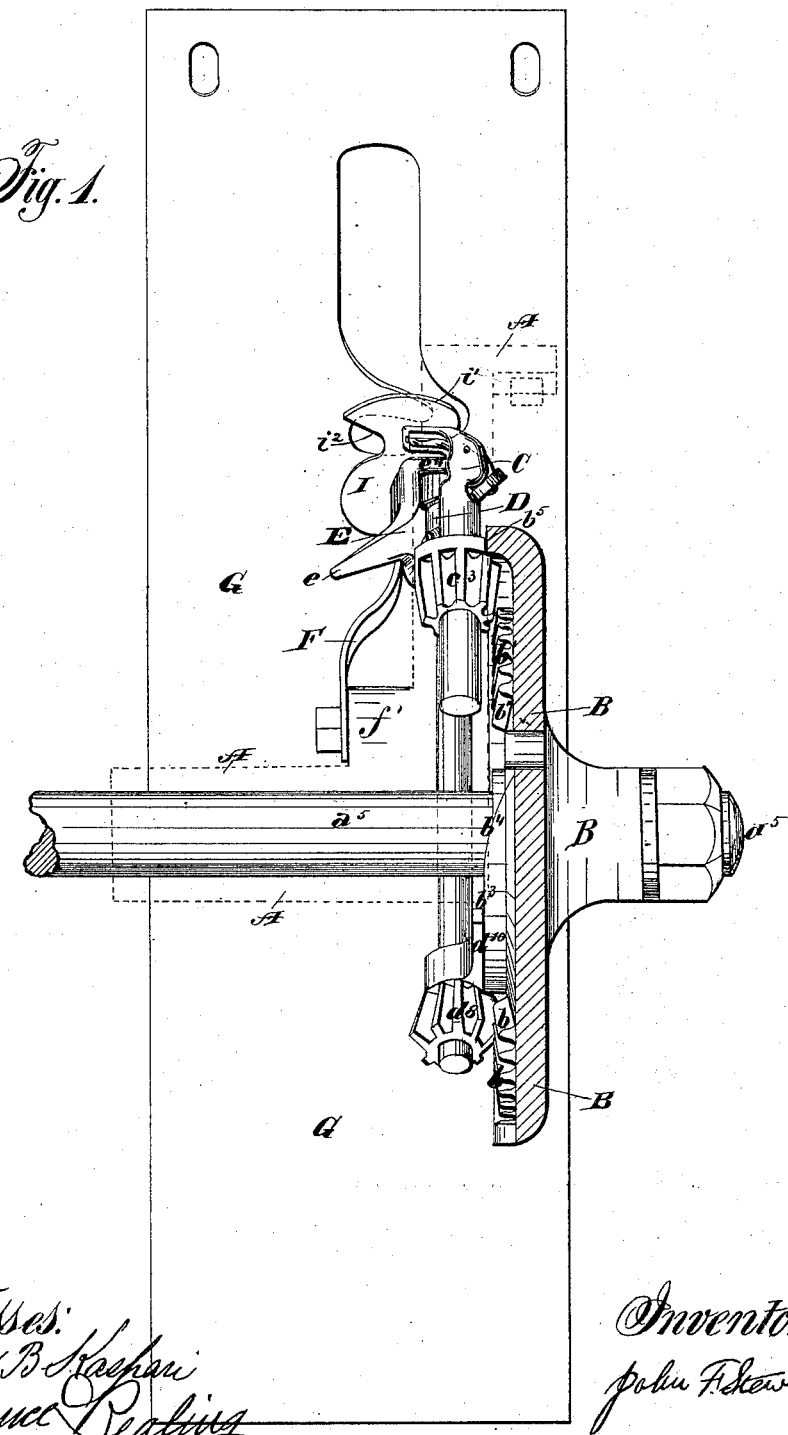

(No Model.)  3 Sheets—Sheet 1.

J. F. STEWARD.
GRAIN BINDER.

No. 366,272.  Patented July 12, 1887.

(No Model.) 3 Sheets—Sheet 2.
J. F. STEWARD.
GRAIN BINDER.
No. 366,272. Patented July 12, 1887.
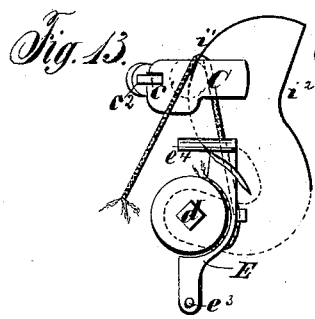
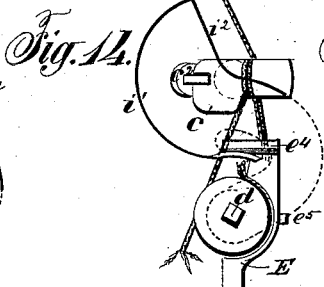
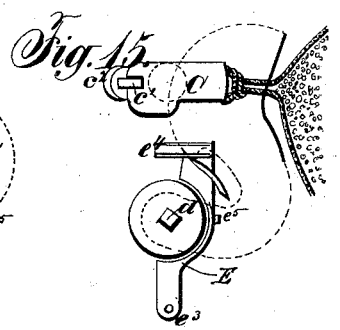
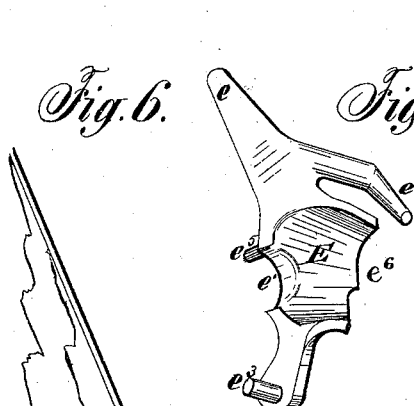
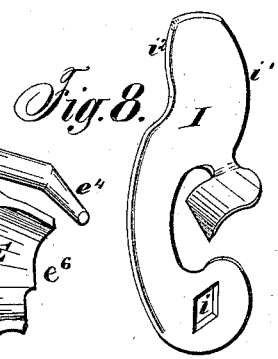
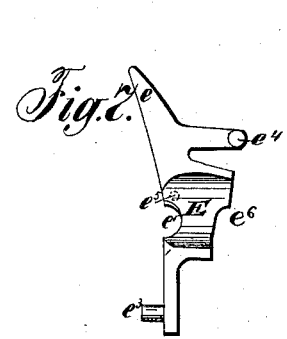
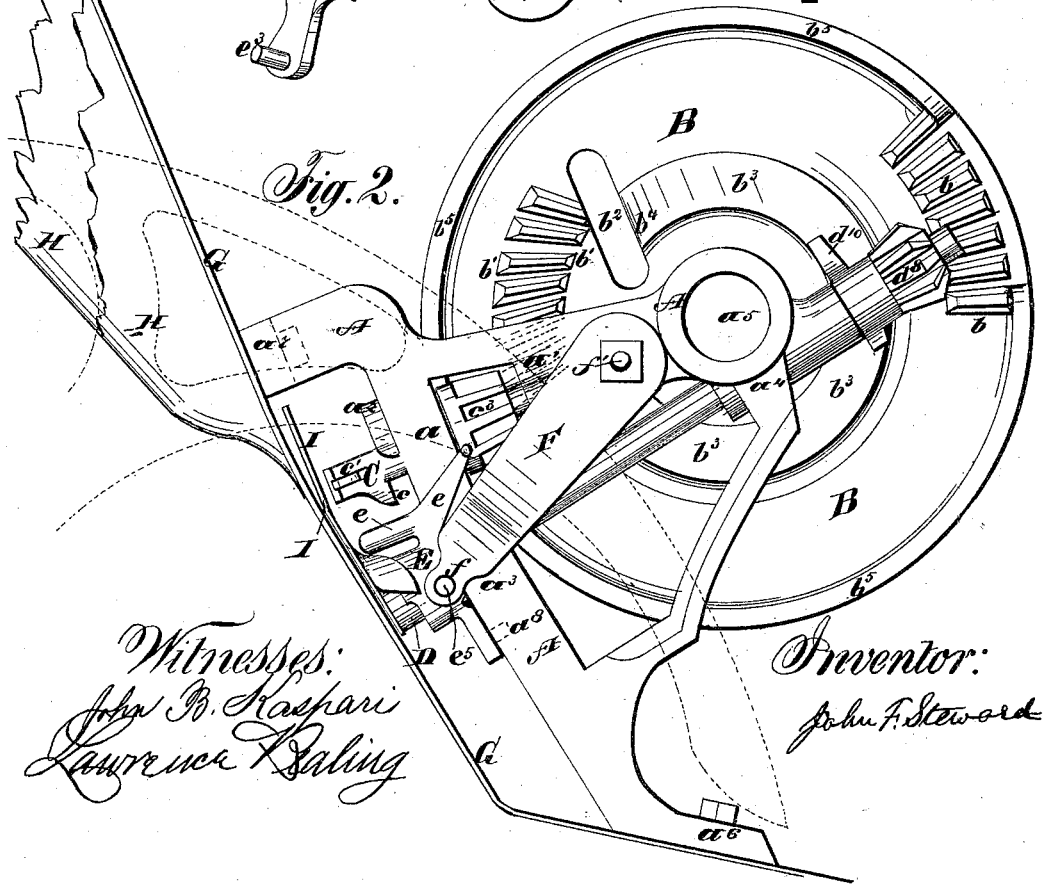
Witnesses:
John B. Kaspari
Lawrence Baling
Inventor:
John F. Steward
N. PETERS, Photo-Lithographer, Washington, D. C.

(No Model.) 3 Sheets—Sheet 3.
J. F. STEWARD.
GRAIN BINDER.
No. 366,272. Patented July 12, 1887.
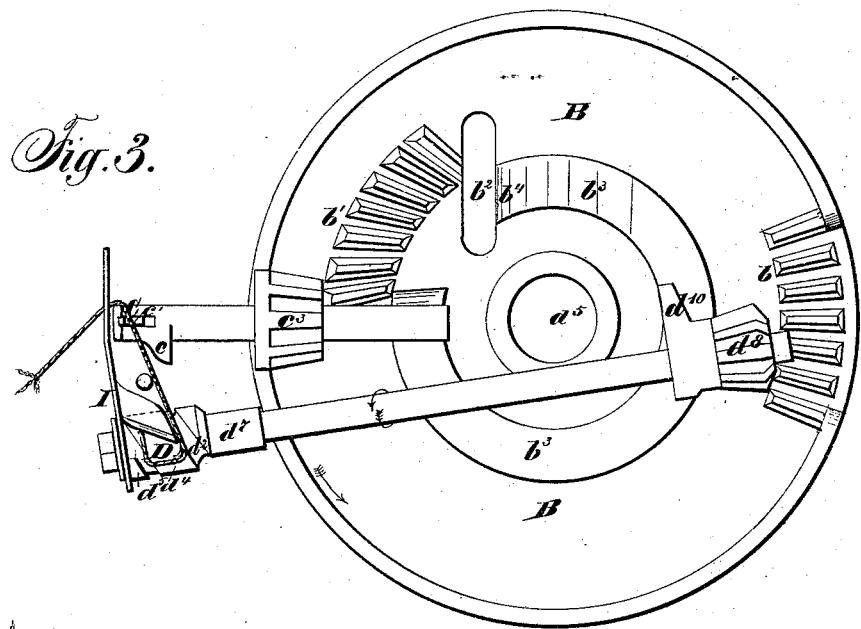
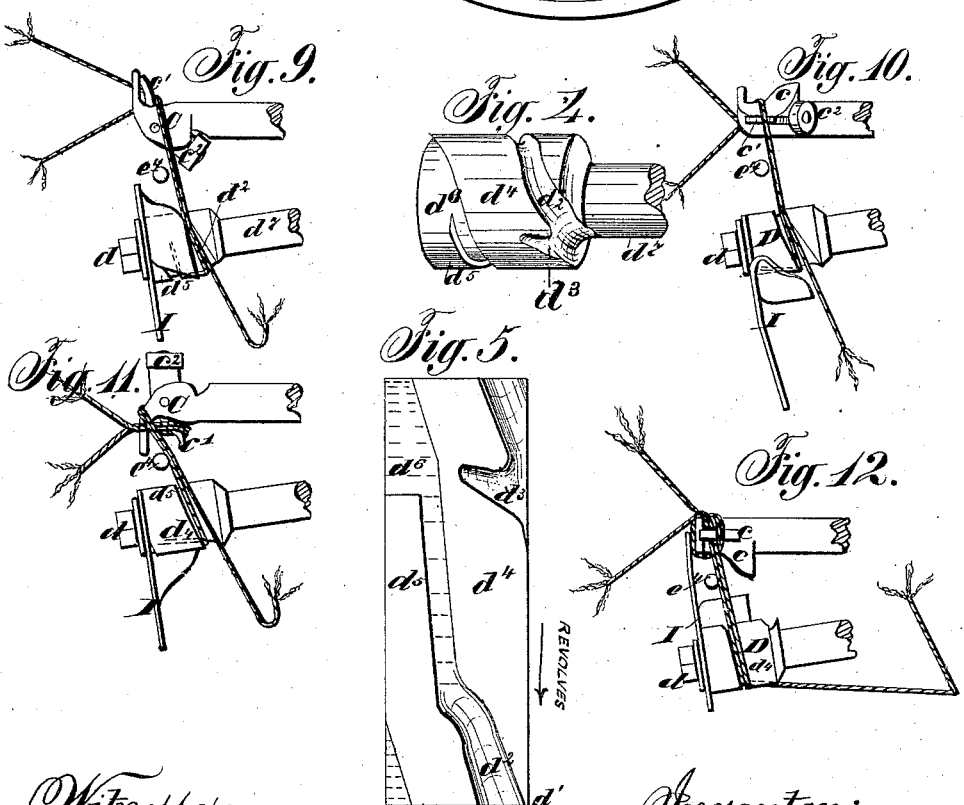
Witnesses:
John B. Kashari
Lawrence Ruling
Inventor:
John F. Steward

UNITED STATES PATENT OFFICE.

JOHN F. STEWARD, OF CHICAGO, ILLINOIS.

GRAIN-BINDER.

SPECIFICATION forming part of Letters Patent No. 366,272, dated July 12, 1887.

Application filed June 29, 1883. Serial No. 99,619. (No model.)

*To all whom it may concern:*

Be it known that I, JOHN F. STEWARD, a citizen of the United States, residing at Chicago, in the county of Cook and State of Illinois, have invented certain new and useful Improvements in Grain-Binders, of which the following is a full specification, reference being had to the accompanying drawings.

My invention relates to the twine holding, tying, cutting, and knot-discharging mechanism; and its nature consists in a novel way of adapting the screw principle to a cord-holder, in producing a rotary cord-holder that shall carry the cutting and knot-discharging devices, and in combinations of parts which will be pointed out and claimed.

In the drawings, Figure 1 is a plan view of my device, the main gear-wheel being shown partially in section; Fig. 2, a side view of the mechanism complete; Fig. 3, a side view of the knotter, holder, shaft, cutter, and stripper. Fig. 4 is a perspective view of the holding-screw. Fig. 5 is a view of the surface of the holding-screw developed or projected in a plane. Fig. 6 is the holder-shoe in perspective, and Fig. 7 the same part, but seen as viewed from its concave side. Fig. 8 is a perspective view of the twine-guide, stripper, and cutter, all shown as combined in one piece. Figs. 9 to 15, inclusive, are views introduced for the purpose of showing the operation of the parts.

A is the knotter-frame; B, the knotter driving-gear; C, the knotter; D, the holding-cord cylinder; E, the holder-shoe; F, the shoe-spring; G, the breast-plate; H, the breast-plate cheeks. I is the twine guide, cutter, and stripper.

The knotter-frame is provided with bearings $a$ and $a'$ for the knotter-shaft.

$a^2$ is a concentric cam-like flange partially surrounding the knotter-shaft and which opens the knotter-jaw.

$a^3$ and $a^4$ are bearings for the holder-cylinder shaft.

$a^5$ is the bearing for the knotter-gear-driving shaft.

$a^6$ and $a^7$ are lugs on the frame to receive bolts, by which the frame and breast-plate are secured together.

$a^8$ is a hole for receiving the dowel-pin of the holder-shoe.

The driving-gear B is provided with the segment $b$, for rotating the knotter-pinion, near the periphery of the gear, and the segment $b'$ within—that is to say, so much nearer the axis of the wheel that it shall not come in contact with the knotter-pinion.

$b^2$ is a slot through the disk of the gear-wheel, for permitting the long extension of the delay-shoe $d^{10}$ to pass.

$b^3$ is the delay-rim for the cylinder-shaft pinion, and the end lettered $b^4$ serves to complete the rotation of the pinion as the extension delay-shoe $d^{10}$ engages it.

$b^5$ is the delay-rim for the knotter-pinion. The knotter C is provided with the inclined flange $c$, which I term the "cast-off," the latch or jaw $c'$, pivoted in a transverse slot through the knotter-head, and having the anti-friction roller $c^2$, which, as the knotter rotates, is brought against the cam $a^2$ on the knotter-shaft bearing, and by the latter the jaw is opened at the proper interval to engage the parts of the twine that is to form the bow of the knot.

$c^3$ is the knotter-pinion having the usual delay-surface, which pinion is so placed as to be engaged by the segment $b$, by which it is given one rotation, and there held by the delay-rim during each rotation of the wheel B.

The holding-cylinder is provided with what may be termed an "irregular screw-thread"—irregular only from preference, as, so constructed, it has given best satisfaction. The thread or elevated spiral surface of the cylinder is much wider than the spiral groove therein.

$d'$ is the beginning of the thread.

The groove at its forward end, $d^2$, is quite deep, so that two strands of twine may lie within it, as shown in Fig. 10.

The space for the two twines may be provided by giving the grooves width or depth, or both, as may be preferred.

$d^3$ is a cone cut in the side of the wide-faced screw-thread.

Between the cone and the margin of the thread a part of the metal is left in the form of a rounded knob, so much rounded that the twine when bent around it, as seen in Fig. 3, will tend to slip over it. This knob I do not find necessary, but use it because by being bent around it the twine is held a little better than if it were not used.

$d^4$ is a part of the thread across which the twine is drawn and against which it is pressed while held.

$d^5$ is the terminal end of the thread, and $d^6$ a space produced by cutting the thread away.

$d^7$ is an enlarged part of the holder-shaft, so enlarged that it shall resist wear in its bearing.

$d^8$ is the cylinder-shaft-driving pinion, its hub having the delay-surface, elongated by the extension $d^{10}$.

The holder-shoe is concaved and fits closely to the surface of the holding-cylinder, and is held thereagainst in the position shown in Figs. 1 and 2.

$e$ is an inclined arm projecting outward, as seen in Fig. 1, and which forms a guide to lead the twine laid by the needle into the groove of the holding-cylinder and into the notch or recess $e'$ in the upper edge of the holder-shoe. With the holder-shoe in place and the holding-cylinder at rest, the notch $e'$ coincides with the groove $d^2$.

$e^3$ is a dowel-pin, which enters a hole, $a^8$, in the frame, and thus prevents the shoe from turning with the holding-cylinder when the latter is revolved.

$e^4$ is an angular finger projecting from near the base of the part $e$, and which serves as a rest for the twine while awaiting the closing of the knotter-jaw upon it, and between which and the shoe the twine is drawn while being cut, as shown in Fig. 14.

$e^5$ is a pin projecting outward from the back of the shoe, upon which an eye, $f$, in the free end of the shoe-holding spring F fits loosely. Thus by the spring the shoe is held in place, and by making both of the pins on the shoe loose in their respective holes the shoe is free to adjust itself to the surface of the holding-cylinder or against the knob $d^3$, when that is provided.

The holder-spring is bolted at $f'$ to a thickened part of the knotter-frame, and between this spring and the knotter-frame, in the space seen in Fig. 1, the needle descends to lay the twine to the knotter and holder.

The breast-plate is of the ordinary construction, other than that I make the needle-slot correspond with the especial requirements of the case. I is the guide, stripper, and cutter—three devices in one. It has a square eye, $i$, which fits onto the squared boss on the end of the holding-cylinder, where it is secured by the screw $d$. When at rest, Fig. 13, its margin $i'$ forms a guide to direct the twine onto the knotter. (See, also, Fig. 1.) Its margin $i^2$ serves as means for deflecting the twine after the knot is laid, so that the stress of expansion or discharge of the bundle shall draw the knot from the knotter, as seen in Fig. 15.

The knotter-jaw may be closed by any of the known methods, and thus held elastically.

The operation is as follows: The needle, in its movement to carry the twine over the gavel, descends to the position shown in dotted lines in Fig. 2, and lays the twine onto the knotter, the edge $i'$ of the stripper and cutter acting as a guide to the groove of the holding-cylinder. The knotter and the holding-cylinder each make a revolution, the latter clamping the twine, as in Fig. 3, and the needle is then retracted. For sake of clearness in describing the operation the shoe is omitted in many of the figures. Now, the gavel is received on the outdrawn twine, and the needle is made to descend in the usual manner and to lay the new strand of twine onto the knotter and into the groove $d^2$ of the holding-cylinder. At this instant the wheel B has moved so far that the segment $b$ has engaged the knotter-pinion, and when the knotter has made so much of a revolution that the cast-off $c$ begins to shed the twine toward the end of the said knotter the segment $b'$ begins to revolve the cylinder-shaft pinion $d^8$, and while the cast-off of the knotter is moving the twine down into the jaws the screw-groove is carrying the said twine in the same direction, it being still held by being pressed between the shoe and the surface of the holding-cylinder.

In Fig. 10 the knotter and holder are shown as having progressed in their respective movements. In Fig. 11 the knotter has reached the position of grasping the twine that is to form the bow, and in Fig. 12 as having done so and come to its place of rest. The holder-cylinder has all this time been moving and at the same time has held the twine first retained by it and the new one, and has screwed them toward the bundle end of the holding-cylinder until they are moved so far as to be across the path of travel of the knife-edge, Figs. 12 and 14. The further movement of the cylinder-shaft carries the knife against the twines and then brings the edge $i^2$ of the stripper against the strands passing from the knotter around the bundle, and when the parts reach their position of rest the strands are deflected, as seen in Fig. 15. By the stress of expansion and discharge the knot is drawn directly off from the jaws of the knotter.

Referring again to the operation of the holder, it will be observed, on referring to Fig. 3, that the retained end of the twine after passing around the knob at $d^3$ lies upon the elevated surface $d^4$ of the cylinder, against which it is pressed by the shoe.

The groove $d^2$ is so large as to admit the new twine also; but as the groove progresses its depth and width are reduced, so that by the time the holding-cylinder has made a quarter of a revolution the two twines are pinched in the groove, so that whether in turning the knob $d^3$ has carried the end of the twine with it or not, the strand is still held. As the rotation of the cylinder progresses the cord finally slips off over the knob, but is still retained in the groove by the pressure of the shoe.

The fragment of twine cut off (see Figs. 12 and 14) is by the succeeding movement of the holding-cylinder screwed out from under the shoe and falls away.

If desirable, the shoe may be so narrow that the extremity of the held end of the twine is screwed beyond the edge $e^6$ of the shoe before the knife approaches it. In this event the said extremity is wholly released and draws away, while only the twine last taken is cut. The twines passing down from the knotter to the holder are by the rotation of the cylinder screwed toward the bundle, to be in position to be grasped by the knotter-jaw; and to arrest these twines and retain them in proper position to be grasped I give the finger $e^4$ the form shown and permit the opened jaws of the knotter to pass either side of it, and the twine resting on it cannot fail to be grasped.

The part of the finger that is parallel with the axis of the holder serves as a resistant to prevent the yielding of the twine before the edge of the knife. The cord being drawn taut from the edge of the shoe up to and over the finger, a very dull knife will serve to sever it, and because of this I am enabled to use hemp twine with perfect results.

In the use of the word "stripper" in this specification, I refer to the plate by which the cord is deflected after the knot is formed, in order that it may be stripped from the tyer by the act of discharging the bundle.

What I claim is—

1. A cord-holder consisting of a cylinder provided with the spiral groove in its periphery, and a co-operating shoe, substantially as described, adapted to confine the cord in the groove.

2. In a cord holding and severing mechanism, the combination of the cylinder provided with the spiral groove in its periphery, a co-operating shoe, and the rotary knife adapted to revolve with the cylinder and around the shoe, substantially as described and shown.

3. The combination of the knotter, the guide $i'$, and a co-operating mechanism, substantially as described, for imparting to said guide an intermitting rotation.

4. The knotter combined with the combined rotary cord-guide and stripper, substantially as described.

5. The combination of the rotary cord-holder, the rotary knife, the rotary stripper and cord-guide, with means, substantially as described, for revolving the same in unison.

6. The holding-cylinder provided with the groove $d^2$, combined with the shoe provided with the twine-guide $e$, substantially as described.

7. In combination with the co-operating shoe, the cord-holding cylinder provided with the spiral groove of increasing area toward its receiving end, whereby the rotation of the cylinder is caused to apply an increasing pressure to the cord.

JOHN F. STEWARD.

Witnesses:
LAWRENCE BEALING,
JOHN B. KASPARI.